United States Patent [19]
Hipp

[11] Patent Number: 5,998,928
[45] Date of Patent: Dec. 7, 1999

[54] LIGHTING INTENSITY CONTROL SYSTEM

[75] Inventor: Kenneth Michael Hipp, Novi, Mich.

[73] Assignee: Ford Motor Company, Dearborn, Mich.

[21] Appl. No.: 08/962,724

[22] Filed: Nov. 3, 1997

[51] Int. Cl.$^6$ .................................................. H05B 37/02
[52] U.S. Cl. .......................... 315/77; 315/82; 315/10.8; 315/307; 307/10.8; 362/800
[58] Field of Search .................... 315/307, 291, 315/77, 84; 327/336, 344, 432, 491, 489, 493, 478; 307/10.8; 362/800, 19

[56] References Cited

U.S. PATENT DOCUMENTS

| | | | |
|---|---|---|---|
| 3,705,316 | 12/1972 | Burrous et al. | 307/311 |
| 4,101,808 | 7/1978 | Flint | 315/151 |
| 4,160,934 | 7/1979 | Kirsch | 315/307 |
| 4,717,868 | 1/1988 | Peterson | 323/288 |
| 4,870,325 | 9/1989 | Kazar | 315/178 |
| 4,947,291 | 8/1990 | McDermott | 362/19 |
| 5,012,392 | 4/1991 | Hochstein | 315/307 |

FOREIGN PATENT DOCUMENTS 246573  6/1969  Russian Federation ............... 327/478

*Primary Examiner*—Michael B Shingleton
*Attorney, Agent, or Firm*—Mark S. Sparschu

[57] ABSTRACT

An illumination control system comprises a source of a lighting intensity control signal, the source having an intensity control signal output. The system also includes at least one first lighting element coupled for direct intensity control by the lighting intensity control signal. Further, the system comprises at least one second lighting element. Additionally, the system comprises a low-pass filter having a filter input and a filter output, the filter input coupled in electrical communication with the intensity control signal output. Also, the system includes a transistor responsively coupled to the filter output and intensity-controllingly coupled to the at least one second lighting element. In one embodiment of the present invention, the transistor has a control input terminal, a second terminal and a third terminal, the control input terminal responsively coupled to the filter output, the second terminal intensity-controllingly coupled to the at least one second lighting element and the third terminal coupled in electrical communication with the intensity control signal output. Systems according to the present invention can be used to effectively control the intensity of lighting elements of different technologies at lower cost than prior art systems.

13 Claims, 1 Drawing Sheet

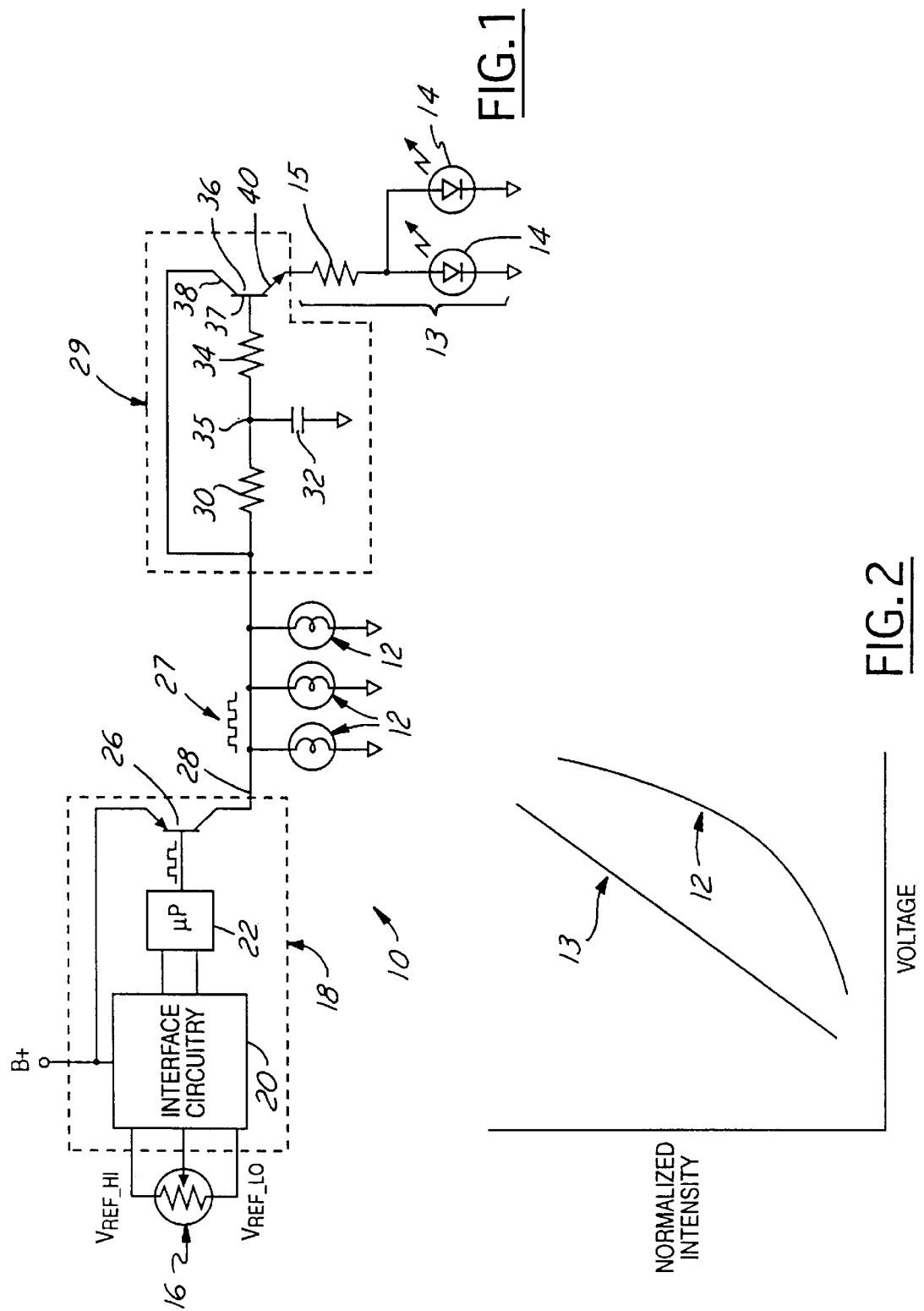

LIGHTING INTENSITY CONTROL SYSTEM

BACKGROUND OF THE INVENTION

1. Field of the Invention

The present invention relates to systems adapted to control lighting intensity.

2. Description of the Related Art

In some environments, for example in the interior of motor vehicles, lighting elements of several different technologies may coexist. On the instrument panel of a vehicle, for instance, switches may be back-lit with incandescent lamps while containing light-emitting diodes which act as enunciators to indicate when the respective switches are turned on. All of such lighting elements are typically dimmable at the control of the vehicle's driver, through the driver's operation of a rheostat.

Where lighting elements of different technologies coexist, a concern arises where the lighting elements of different technologies have different lighting intensity versus applied voltage characteristics. Where this is the case, such as with incandescent lamps and light-emitting diodes, it is difficult to control the intensity of the different lamps uniformly over their entire intensity ranges. Non-uniform relative intensity of the lamps can be the result. This is a potential source of customer dissatisfaction in a vehicle whose interior is carefully designed to have a highly refined appearance.

One way to overcome the different intensity versus applied voltage characteristics of different lighting technologies is to use a microprocessor to apply different lighting transfer functions to the lighting elements of different technologies. The different transfer functions compensate for the different intensity versus voltage characteristics of the lighting elements. However, this solution is not totally satisfactory, as different intensity control circuits are needed for the different lighting elements. This can add cost. Also, microcomputer resources are fairly expensive, so using a microprocessor to individually calculate several lighting transfer functions can be costly.

Therefore, a system which can provide modify the intensity versus voltage characteristics of lighting elements more cost-effectively than the prior art will prove advantageous.

SUMMARY OF THE INVENTION

The present invention provides a lighting intensity control system. The system comprises a source of a lighting intensity control signal, the source having an intensity control signal output. The system also includes at least one first lighting element coupled for direct intensity control by the lighting intensity control signal. Further, the system comprises at least one second lighting element Additionally, the system comprises a low-pass filter having a filter input and a filter output, the filter input coupled in electrical communication with the intensity control signal output. Also, the system includes a transistor responsively coupled to the filter output and intensity-controllingly coupled to the at least one second lighting element. In one embodiment of the present invention, the transistor has a control input terminal, a second terminal and a third terminal, the control input terminal responsively coupled to the filter output, the second terminal intensity-controllingly coupled to the at least one second lighting element and the third terminal coupled in electrical communication with the intensity control signal output.

Systems according to the present invention can be used to effectively control the intensity of lighting elements of different technologies at lower cost than prior art systems. In doing so, the present invention provides substantial advantages over the prior art.

BRIEF DESCRIPTION OF THE DRAWINGS

FIG. 1 is a schematic diagram of a lighting intensity control system 10 according to one embodiment of the present invention.

FIG. 2 illustrates typical lighting intensity versus voltage characteristics for first lighting elements 12 and second lighting elements 13 of FIG. 1.

DETAILED DESCRIPTION OF THE PREFERRED EMBODIMENT

Referring to FIG. 1, a lighting intensity control system 10 according to one embodiment of the present invention includes at least one first lighting elements 12 and at least one second lighting elements 13. In this embodiment of the present invention, first lighting elements 12 are incandescent lamps, lighting elements which have considerably nonlinear intensity versus voltage characteristics. Also, in this embodiment of the present invention, second lighting elements 13 are light-emitting diodes 14, either individually or collectively having a current-limiting resistor such as resistor 15. Light-emitting diodes in combination with current-limiting resistors have significantly linear intensity versus voltage characteristics, especially so if one assumes that the forward voltage drop of the light-emitting diode is negligible. First lighting elements 12 and second lighting elements 13 are, for example, lighting elements located on the dashboard of a passenger vehicle.

Referring additionally to FIG. 2, typical normalized lighting intensity versus voltage curves are shown for first lighting elements 12 and second lighting elements 13. "Normalized intensity" is lighting intensity as a fraction of the maximum lighting intensity of the particular lighting elements. The significantly nonlinear characteristic of first lighting elements 12 and the considerably linear characteristic of second lighting elements 13 are apparent. Incandescent lamps demonstrate a nonlinear characteristic primarily because heating of the lamp changes the lamp's electrical resistance.

A rheostat 16 is provided for user control of the intensity of first lighting elements 12 and second lighting elements 13. Rheostat 16 is provided a voltage reference $V_{REF\_HI}$ (typically 5 volts) and a return $V_{REF\_LO}$. Rheostat 16 outputs an analog voltage which is proportional to the user's desired intensity of first lighting elements 12 and second lighting elements 13. The signal from rheostat 16 goes into an electronic module 18 which includes interface circuitry 20. Interface circuitry includes appropriate signal conditioning circuitry such as a filter for attenuating electrical noise, as well as an analog-to-digital converter for converting the analog signal from rheostat 16 into a digital signal which can be used by microprocessor 22. Microprocessor 22 is any microprocessor or microcontroller with suitable microcomputer resources (inputs, outputs, memory, throughput and the like) to perform the functions ascribed to it in this disclosure.

A B+ (battery voltage) input is also provided to module 18. The voltage at the B+ input is read by microprocessor 22 through interface circuitry 20.

Microprocessor 22 outputs lighting intensity signal 24. Preferably, lighting intensity signal 24 is a pulse-width-modulated signal whose duty cycle is proportional to the desired intensity of first lighting elements 12 and second lighting elements 13. This desired intensity is preferably a function of both the signal from rheostat 16 and the B+ voltage, the function preferably stored in a look-up table in the memory of microprocessor 22. The dependence upon B+ voltage is provided so that system voltage in the vehicle can be compensated for; in that manner, the intensity of first lighting elements 12 and second lighting elements 13 can be made independent of variations is system voltage of the vehicle. Such compensation based on B+ voltage is well-known in the art.

Lighting intensity signal 24 is provided to transistor 26, which has appropriate gain to provide current for illuminating first lighting elements 12 and second lighting elements 13. Transistor 26 outputs a second, higher-current, lighting intensity signal 27 from output 28 of module 18. Obviously, second lighting intensity signal 27 is pulse-width modulated (as is lighting intensity signal 24).

As FIG. 1 illustrates, lighting intensity signal 27 is directly provided to first lighting elements 12 through direct coupling of first lighting elements 12 to output 28. As indicated previously, first lighting elements 12 have significantly nonlinear intensity versus voltage characteristics. Therefore, circuitry 29 is interposed between output 28 and second lighting elements 13 in order to make the intensity versus voltage characteristics of second lighting elements 13 react nonlinearly (and similarly to the characteristics of first lighting elements 12) as well.

A low-pass filter comprising resistor 30 and capacitor 32 is coupled to output 28 to receive second lighting intensity signal 27. Base resistor 34 is coupled to the "output" 35 of the low-pass filter and to the base 37 of transistor 36. Collector 38 of transistor 36 is coupled back to output 28. Emitter 40 of transistor 36 is coupled through current-limiting resistor 15 to light-emitting diodes 14.

The operation of circuitry 29 is best illustrated by an example. Suppose first that lighting intensity signal 27 is at a 25% duty cycle and that the amplitude of lighting intensity signal 27 is 16 volts. The "averaged" value at output 35 of the low-pass filter is thus about 4 volts (25 percent of 16 volts). Transistor 36 will thus tend to be "on", and the current through light-emitting diodes 14 (assuming for the sake of simplicity of explanation a negligible base-emitter voltage drop of transistor 36, a negligible forward diode drop of light-emitting diodes 14 and a negligible voltage drop across base resistor 34) will tend to be 4 volts/$R_{15}$. $R_{15}$ is the resistance of resistor 15. However, significant current can only flow when second lighting intensity signal 27 is at a "high" portion of its duty cycle, because second lighting intensity signal 27 is the source of collector current for transistor 36. Thus, because lighting intensity signal 27 is assumed to be at a 25% duty cycle for this scenario, the actual average current through light-emitting diodes 14 will be 1 volt/$R_{15}$.

Now, assume that lighting intensity signal 27 is at a 50% duty cycle. The "averaged" value at output 35 of the low-pass filter is thus about 8 volts (50 percent of 16 volts). The current through light-emitting diodes 14 will thus tend to be 8 volts/$R_{15}$. However, again, significant current can only flow to light-emitting diodes 14 when second lighting intensity signal 27 is at a "high" portion of its duty cycle. This occurs 50% of the time in this scenario, so the average current through light-emitting diodes 14 will actually be 4 volts/$R_{15}$.

Note from the above two scenarios that a two-fold increase in the duty cycle of second lighting intensity signal 27 (from 25% to 50%) has created a four-fold increase in current through light-emitting diodes 14 (from 1 volt/$R_{15}$ to 4 volts/$R_{15}$). As intensity of illumination of a light-emitting diode is proportional to current, the two-fold increase in duty cycle of second lighting intensity signal 27 has created a four-fold increase in intensity of light-emitting diodes 14. That is, the intensity versus voltage characteristic of second lighting elements 13 has been transformed from a highly linear characteristic to a significantly nonlinear one. In fact, it has been demonstrated that in this embodiment of the present invention the effective intensity versus voltage characteristic of second lighting elements 13 has been transformed to significantly resemble the intensity versus voltage characteristic of first lighting elements 12.

Two preferred design considerations can be discussed here. First, resistor 30 and capacitor 32 are preferably selected such that the low-pass filter comprising those elements has a relatively long time constant with respect to the PWM frequency of lighting intensity control signal 27. Thus, a significant averaging effect of lighting intensity control signal 27 will occur. Second, transistor 36 is preferably selected to be of relatively high gain, so not a large amount of base current is required. The low-pass filter comprising resistor 30 and capacitor 32 will therefore not be heavily loaded.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A lighting intensity control system comprising:
    a source of a lighting intensity control signal, said source having an intensity control signal output;
    at least one first lighting element coupled to said intensity control signal output;
    at least one second lighting element;
    a low-pass filter having a filter input and a filter output, said filter input coupled in electrical communication with said intensity control signal output; and
    a transistor having a control input terminal, a second terminal and a third terminal, said control input terminal responsively coupled to said filter output, said second terminal intensity-controllingly coupled to said at least one second lighting element and said third terminal coupled in electrical communication with said intensity control signal output.

2. A lighting intensity control system as recited in claim 1, wherein said at least one first lighting element has an intensity versus voltage characteristic of lesser linearity than an intensity versus voltage characteristic of said at least one second lighting element.

3. A lighting intensity control system as recited in claim 2, wherein said at least one second lighting element has a substantially linear intensity versus voltage characteristic.

4. A lighting intensity control system as recited in claim 3, wherein:
    said transistor is a bipolar transistor;
    said control terminal is a base of said transistor;
    said second terminal is an emitter of said transistor; and
    said third terminal is a collector of said transistor.

5. A lighting intensity control system as recited in claim 1, wherein said at least one first lighting element is an incandescent lamp and said at least one second lighting element comprises a light-emitting diode.

6. A lighting intensity control system as recited in claim 5, wherein:

said transistor is a bipolar transistor;

said control terminal is a base of said transistor;

said second terminal is an emitter of said transistor; and said third terminal is a collector of said transistor.

7. A lighting intensity control system comprising:

a source of a lighting intensity control signal, said source having an intensity control signal output;

at least one first lighting element coupled for direct intensity control by said lighting intensity control signal;

at least one second lighting element;

a low-pass filter having a filter input and a filter output, said filter input coupled in electrical communication with said intensity control signal output; and a transistor having a control input terminal, a second terminal and a third terminal, said control input terminal responsively coupled to said filter output, said second terminal intensity-controllingly coupled to said at least one second lighting element and said third terminal coupled in electrical communication with said intensity control signal output.

8. A lighting intensity control system as recited in claim 7, wherein said at least one first lighting element has an intensity versus voltage characteristic of lesser linearity than an intensity versus voltage characteristic of said at least one second lighting element.

9. A lighting intensity control system as recited in claim 8, wherein said at least one second lighting element has a substantially linear intensity versus voltage characteristic.

10. A lighting intensity control system as recited in claim 9, wherein:

said transistor is a bipolar transistor;

said control terminal is a base of said transistor;

said second terminal is an emitter of said transistor; and said third terminal is a collector of said transistor.

11. A lighting intensity control system as recited in claim 7, wherein said at least one first lighting element is an incandescent lamp and said at least one second lighting element comprises a light-emitting diode.

12. A lighting intensity control system as recited in claim 11, wherein:

said transistor is a bipolar transistor;

said control terminal is a base of said transistor;

said second terminal is an emitter of said transistor; and said third terminal is a collector of said transistor.

13. A lighting intensity control system comprising:

a source of a lighting intensity control signal, said source having an intensity control signal output;

at least one first lighting element coupled for direct intensity control by said lighting intensity control signal;

at least one second lighting element;

linearity-reducing means for reducing a linearity of a lighting intensity versus voltage characteristic of said at least one second lighting element, said linearity reducing means having an input coupled in electrical communication with said intensity control signal output and an output coupled to said at least one second lighting element.

* * * * *